Inventors:
Richard A. De Pauw
William H. Knapp

Dec. 9, 1969  R. A. DE PAUW ETAL  3,482,577
TAILINGS RETURN

Filed June 21, 1967  2 Sheets-Sheet 2

Inventors:
Richard A. De Pauw
William H. Knapp

United States Patent Office 3,482,577
Patented Dec. 9, 1969

3,482,577
TAILINGS RETURN
Richard A. De Pauw, East Moline, Ill., and William H. Knapp, Davenport, Iowa, assignors to International Harvester Company, Chicago, Ill., a corporation of Delaware
Filed June 21, 1967, Ser. No. 647,774
Int. Cl. A01f 7/04, 12/18
U.S. Cl. 130—27                            5 Claims

ABSTRACT OF THE DISCLOSURE

An apparatus for returning the tailings in an axial flow combine and a drive arrangement therefor. The tailings elevator is spaced outwardly from the side walls of the combine and discharges into a transverse tubular casing having an open ended auger journaled therein. The elevator is driven from a sheave located at the upper end between the elevator and the combine's side wall and rotary motion is transmitted from the elevator's driven shaft to the auger journaled in the transverse tubular casing.

BACKGROUND OF THE INVENTION

This invention pertains to a tailings return for an axial flow threshing machine.

In present commercially available combines the material to be threshed is fed between a rotating cylinder and a stationary concave in a direction normal to the axis of the rotating cylinder. Much of the grain contained in the material fed to the cylinder and concave passes through the concave as threshed grain. The remainder of the material is conveyed to the separating component of the combine which in conventional combines includes reciprocating or oscillating straw racks, return pans, and chaffer sieves. The subject invention concerns a combine that operates on a completely different principle than the above-described commercially available combines. In the combine described in the subject application an elongated rotor is provided along a longitudinal axis of the combine. The elongated rotor is enclosed within a cylinder having transport fins provided along its upper internal surface and a concave and grate provided along its lower surface. The material to be threshed is fed into the front end of the cylinder and is metered axially towards the rear while being processed by the cooperating elements on the rotor and cylinder. An axial flow type combine such as this has the obvious advantage over a conventional combine in the simplicity of its drive since it utilizes only simple rotary drives and does not include oscillating or reciprocating elements. This not only simplifies the drive for the separating section, but also reduces vibrations considerably. Furthermore, the elements of an axial flow type separating section have better structural stability than those of conventional separating sections and are thus more durable and reliable. Reference may be made to the U.S. patent to Schlayer No. 1,688,662 of October 23, 1928 and the copending applications of Knapp et al. Ser. No. 584,054 filed on Sept. 29, 1966 and Knapp et al. Ser. No. 588,191 filed on Oct. 20, 1966 for a more complete disclosure of axial flow type combines.

In combines of this type the harvested material is threshed and separated in the axial cylinder and the residue is then processed by a cleaning system. The remnants of the cleaning system (that material not collected as clean grain or discharged as chaff or fines) are called tailings. The tailings include stalks or stems to which there is connected grain which material has value. In most conventional combines the tailings are returned to the threshing section of the combine and are re-cycled through the threshing, separating and cleaning mechanisms. Since the tailings have already been exposed to considerable processing, very little additional agitation is required to separate some kernels of grain from their stalks. The conveying mechanism for transporting the tailings from the tailings collector to the threshing section of the combine causes a considerable proportion of the tailings grain to be separated and there is no need to re-thresh and re-separate this portion of the tailings. However, in the prior art devices the separated grain contained in the tailings is reprocessed through the threshing, separating and cleaning mechanisms. It has been found that not only is this re-threshing and separating a wasted effort, but furthermore it unnecessarily subjects the grain to the possibility of being cracked or otherwise damaged.

SUMMARY OF THE INVENTION

In a tailings return and drive therefor disclosed herein the tailings grain separated by the tailings conveyors is re-cycled through the cleaning mechanism but by-passes the threshing and separating mechainsms. Thus the likelihood of damaging this grain is reduced and the unnecessary task of re-threshing and separating the grain is avoided. The tailings material not separated out by the tailings conveyor is fed to the threshing mechanism and subjected to another complete cycle of threshing, separation and cleaning. The drive for the tailings elevator in the transverse conveyor is taken from a single source and the drive sheave is located between the tailings elevator and the combine's side wall such that the elevator provides a shield for the sheave.

DESCRIPTION OF THE PREFERRED EMBODIMENT

Figure 1:
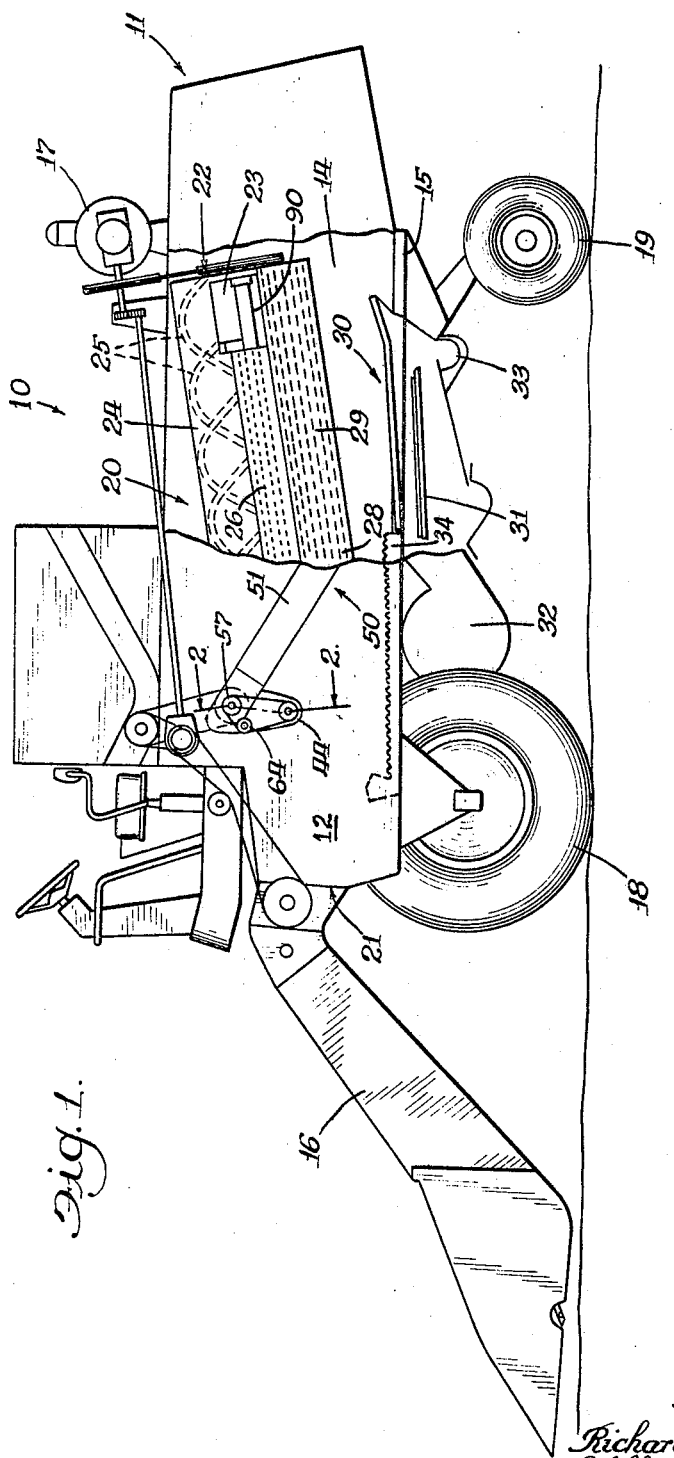
FIGURE 1 shows a side view of an axial flow type combine including the subject tailings return and having a portion of the side wall broken away to better illustrate the cleaning mechanism.

Referring now to the drawings wherein like reference characters designate like or corresponding parts throughout the several views there is shown in FIGURE 1 an axial flow combine generally designated 10. The combine 10 is made up of a housing 11 having a base 15, a first side wall 12 and a second side wall 14. The axial flow combine 10 includes a conventional pick-up platform 16, power source 17, drive wheels 18 and dirigible wheels 19. An elongated tubular casing 20 is carried within the housing 11 between the first and second side walls 12 and 14 respectively. The harvested material is fed from the pick-up platform 16 into the elongated tubular casing 20 through an inlet end 21. Elongated rotor 90 is mounted for rotation within said tubular casing 20 and can be seen in FIGURE 1 through the discharge opening 23. For a more complete disclosure of an elongated rotor of this type, reference may be made to the above referred to Knapp et al. applications Ser. Nos. 584,054 and 588,191. The material is then processed within the elongated tubular casing as it is moved from the inlet end 21 towards the discharge end 22. Straw chaff and other debris is discharged from the elongated tubular casing through the discharge opening 23. The elongated tubular casing 20 has a top 24 that has spiral transport fins 25 secured to its inner surface. Below each edge of the top 24 there is a side grate 26 that extends the length of the tubular casing. The bottom of the elongated tubular casing is made up of a concave 28 and grate 29.

The grain cleaning system 30 is carried on the base 15 of the housing 11 and extends from the first side wall 12 to the second side wall 14. The grain cleaning system 30 is of conventional construction having a grain pan 34, a shaker shoe 31, a fan 32 and a tailings collector 33. Reference may be made to the Williams Patent No. 1,257,058 of Feb. 19, 1918, for a showing of an axial flow combine having such a cleaning system.

Figure 2:
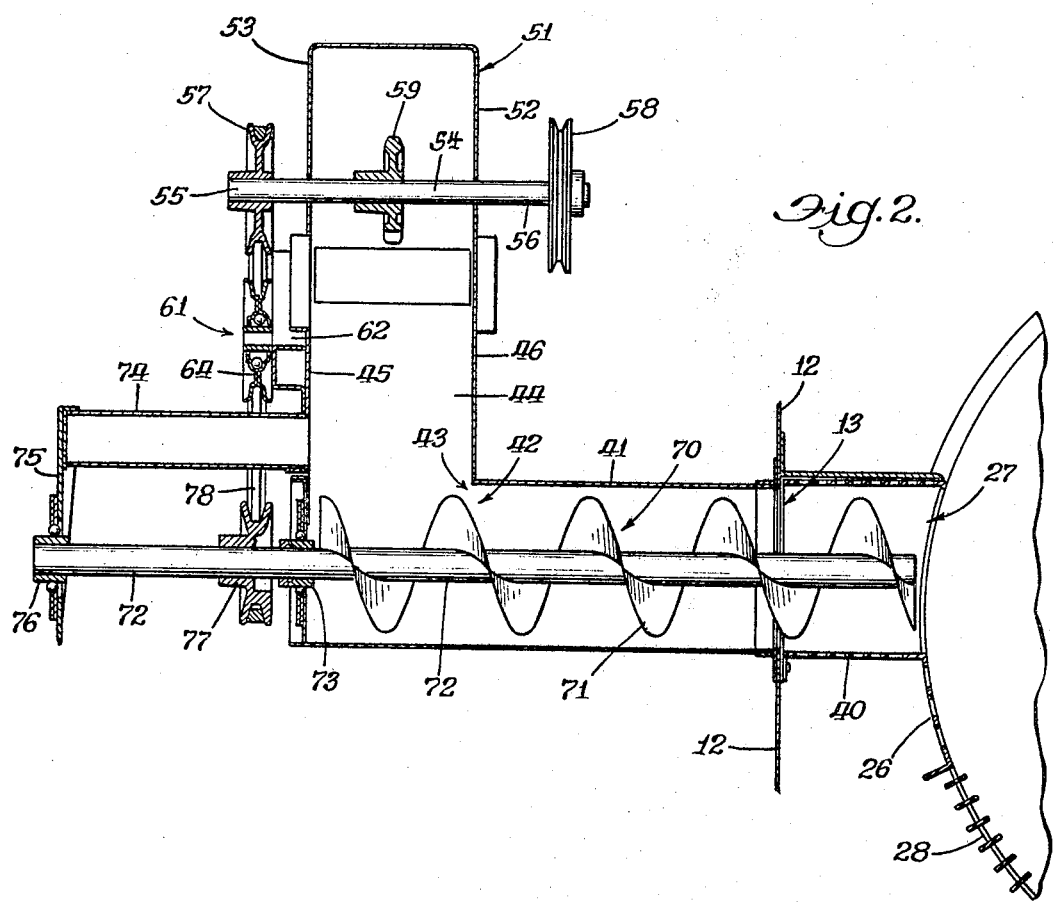
FIGURE 2 is an enlarged cross sectional view of a portion of the combine taken along lines 2—2 of FIGURE 1.
Figure 3:
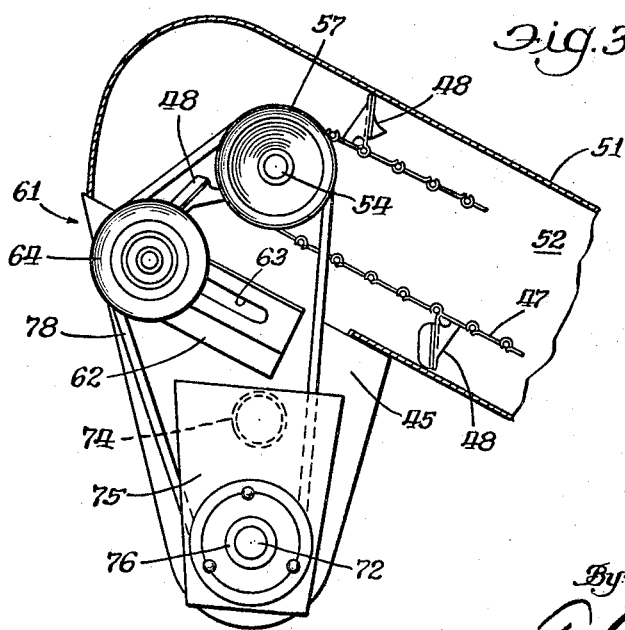
FIGURE 3 is an enlarged side view of the upper end of the tailings elevator.

The tailings gathered in the tailings collector are transferred to the tailings conveyor 50 that includes an elevator 51. The tailings conveyor 50 functions to transport the grain gathered in the tailings collector 33 to a point that is above and forward of the tailings collector. Reference should be made to FIGURES 1 through 3 inclusive for the description of the tailings conveyor. The elevator 51 has an inner wall 52 and an outer wall 53. As can be best seen in FIGURE 2 the elevator inner wall 52 is outwardly spaced from the first side wall 12 of the housing. A drive shaft 54 is journaled on the upper portion of the inner and outer walls 52 and 53. The drive shaft 54 has an outer end portion 55 upon which is mounted a sheave means 57 and an inner end portion 56 upon which is mounted a sheave 58. As shall be further discussed the drive shaft 54 receives its drive through the sheave 58. An elevator sprocket 59 is carried on shaft 54 between the elevator walls 52 and 53. A continuous chain reference numeral 47 having slots 48 secured thereto is mounted on and driven by the elevator sprocket 59 and another sprocket located at the lower end of the elevator and functions in a conventional way to convey the material up the elevator.

The upper end of the elevator 51 empties into a hopper 44 that has an arcuate bottom and an opening 43 along its inner wall. An unperforated conduit 41 having an inlet opening 42 is connected to the hopper 44 about the opening 43 formed in its inner wall. The other end of conduit 41 is connected to the first side wall 12 about a first opening 13 formed therein thus a passageway is formed from the open end of the elevator 51 through the hopper 44 and conduit 41 into the interior of the housing 11. A perforated conduit 40 is mounted on the interior of the first side wall 12 in alignment with the first opening 13 in the unperforated conduit 41. The unperforated conduit 41 is aligned with the perforated conduit 40 such that it is an extension thereof. A second opening 27 is formed in the side grate 26 in alignment with the first opening 13. The perforated conduit 40 extends from the first side wall 12 and connects to the side grate 26 about the second opening 27.

An open ended auger 70 made up of a core 72 and a flighting 71 is rotatably mounted at bearing 73 that is carried by the outer wall 45 of the hopper 44. As can best be seen in FIGURE 2 the core 72 extends in both directions from the bearing 73. The core terminates at one end adjacent the second opening 27 formed in the side grate 26. The flighting 71 extends along the core from the outer wall of the hopper 44 through the hopper, the unperforated conduit 41 and the perforated conduit 40 terminating with the core adjacent the second opening 27 in the side grate 26. The free end of the auger 70 is thus unsupported and is in effect cantilevered from the bearing 73. In order to provide additional support for the auger 70 a second bearing 76 is spaced outwardly from bearing 73 and is provided for supporting the core 72. A post 74 is secured to and extends outwardly from the outer wall of the hopper 44 from a position above the bearing 73. The outer end of post 74 carries a plate 75 that extends downwardly therefrom. The bearing 76 is carried by the plate 75. A first sheave 77 is rigidly connected to the core 72 between the bearings 73 and 76. The sheave 77 is aligned with the sheave 57 carried by drive shaft 54. Flexible drive means 78 such as a belt connects sheave 57 with sheave 77. As can be best seen in FIGURE 3 tension adjusting means 61 are mounted on the outer wall of the hopper 44 for adjusting the tension in the flexible drive means 78. The tension adjusting means 61 includes a channel 62 secured to the outer wall of hopper 44. It should be noted that the drive shaft 54 upon which the sheave 57 is mounted is located above the auger core 72 that carries the sheave 77. The channel 62 extends along a line at an acute angle to align perpendicular to the line connecting shaft 54 and core 72. The channel 62 has a slot 63 formed therein in which can be mounted a sheave 64. The position of the sheave 64 can be adjusted with respect to the channel by securing it at any position along the slot 63. Thus as the sheave 64 is adjusted along the slot 63 tension can be increased or decreased in the flexible drive means 78.

As can be best seen in FIGURE 1 the sprocket 58 is driven through various drive means by the power source 17. Sheave 58 is rigidly secured to drive shaft 54 and thus the sprocket 59 and the sheave 57 are rotated along with the drive shaft 54. The tailings elevator receives its drive from sprocket 59 and functions to raise the grain from the tailings collector 33 through the elevator 51 and deposit it in the hopper 44. The material deposited in the hopper 44 encounters the open ended auger 70 that functions to convey it out of the hopper 44 through the conduit 41 and into the perforated conduit 40. The perforations in conduit 40 are of such a size to permit any grain that has been separated or being transported from the tailings collector 53 to pass through the perforated conduit 40 and fall by gravity downwardly to the grain cleaning system 30. The material that is too large to pass through the openings in perforated conduit 40 is fed through the second opening 27 formed in the side grate 26 where it is reprocessed by the threshing, separating and cleaning mechanism of the combine.

What is claimed is:

1. In an axial flow combine:
a housing having a base and upstanding first and second side walls;
an elongated tubular casing supported on said housing above said base and spaced from said first side wall,
said tubular casing having an inlet end through which unthreshed agricultural crops enter and a discharge end through which straw and debris exit,
said tubular casing including a top having spiral transport fins protruding from the internal surface, and a concave forming at least a portion of the bottom;
an elongated rotor mounted for rotation within said tubular casing;
a grain cleaning system carried by said base, said grain cleaning system adapted to collect and process all material that passes through said tubular casing, said grain cleaning system having a tailings collector for collecting unthreshed material;
a first opening formed in said first side wall of the combine housing at the level of said tubular casing and adjacent to said concave;
a second opening formed in the side of said tubular casing;
a perforated conduit connecting said first opening to said second opening;
a tailings conveyor for feeding the tailings from said tailings collector through said first opening and towards said second opening such that separated grain can pass through the perforated conduit to said grain cleaning system and the unthreshed material will pass through said second opening into said tubular casing for reprocessing.

2. The invention as set forth in claim 1 wherein an unperforated extension of said perforated conduit extends from said first opening in a direction away from said tubular casing terminating in an inlet opening;
a hopper connected to said extension about said inlet opening;
said tailings conveyor including an elevator that discharges tailings material into said hopper.

3. The invention as set forth in claim 1 wherein an open ended auger is journaled in said hopper and extends through the unperforated and perforated conduits and drive means for rotating said open ended auger to feed material through said conduits towards said second opening.

4. The invention as set forth in claim 3 wherein said drive means includes a first sheave carried by the core of said open ended auger externally of said hopper;

said elevator having an inner wall spaced from said first side wall and an outer wall coinciding with the outer wall of said hopper, an elevator drive shaft journaled in said elevator inner and outer walls above said open ended auger, a second sheave carried by said elevator drive shaft adjacent said outer wall and aligned with said sheave carried by the core of said open ended auger, flexible drive means connecting said second sheave to said first sheave, said elevator drive shaft having an end portion extending through said elevator inner wall into the space between said elevator and said first side wall, and means on said end portion for driving said elevator drive shaft.

5. The invention as set forth in claim 4 wherein means are provided for adjusting the tension in said drive means.

References Cited

UNITED STATES PATENTS 1,688,662  10/1928  Schlayer _____ 130—27
2,433,162  12/1947  Scranton et al. _____ 130—27

ANTONIO F. GUIDA, Primary Examiner